(12) United States Patent
Chueh et al.

(10) Patent No.: US 9,445,370 B2
(45) Date of Patent: Sep. 13, 2016

(54) WIRELESS DATA NETWORK SWITCHING METHOD AND ELECTRONIC DEVICE THEREOF

(71) Applicant: HTC Corporation, Taoyuan County (TW)

(72) Inventors: Hsin-Ti Chueh, Taoyuan County (TW); Chia-Wei Chen, Taoyuan County (TW); Chen-Huang Fan, Taoyuan County (TW); Chien-Nan Lin, Taoyuan County (TW); Chi-Sheng Kai, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 13/831,814

(22) Filed: Mar. 15, 2013

(65) Prior Publication Data

US 2013/0267271 A1 Oct. 10, 2013

Related U.S. Application Data

(60) Provisional application No. 61/620,982, filed on Apr. 6, 2012.

(51) Int. Cl.
*H04M 11/00* (2006.01)
*H04W 52/02* (2009.01)

(52) U.S. Cl.
CPC ................ *H04W 52/0258* (2013.01)

(58) Field of Classification Search
CPC ............. H04M 2215/32; H04W 52/0251; H04W 52/0258; H04W 12/08; H04W 12/12
USPC .............. 455/412.1, 414.1–414.2, 435.2, 455/405–407
See application file for complete search history.

(56) References Cited

U.S. PATENT DOCUMENTS

| | | | |
|---|---|---|---|
| 6,449,350 B1 * | 9/2002 | Cox | 379/134 |
| 8,229,453 B2 | 7/2012 | Malomsoky | |
| 8,589,541 B2 * | 11/2013 | Raleigh et al. | 709/224 |
| 2006/0223495 A1 * | 10/2006 | Cassett et al. | 455/405 |
| 2010/0015926 A1 * | 1/2010 | Luff | 455/67.13 |
| 2010/0110890 A1 * | 5/2010 | Rainer et al. | 370/232 |
| 2010/0330954 A1 * | 12/2010 | Manning Cassett et al. | 455/405 |
| 2011/0255404 A1 * | 10/2011 | Kafka | H04L 41/0896 370/232 |
| 2012/0315960 A1 * | 12/2012 | Kim | 455/574 |

(Continued)

FOREIGN PATENT DOCUMENTS

| | | |
|---|---|---|
| JP | H11252075 A | 9/1999 |
| JP | 2000244601 A | 9/2000 |

(Continued)

OTHER PUBLICATIONS

Office action mailed on Mar. 11, 2014 for the Japanese application No. 2013-078310, filed: Apr. 4, 2013, pp. 1-3.

(Continued)

*Primary Examiner* — Simon Nguyen
(74) *Attorney, Agent, or Firm* — Winston Hsu; Scott Margo

(57) ABSTRACT

A wireless data network switching method for an electronic device is disclosed. The wireless data network switching method includes recording a pattern of network data usage of the electronic device during a period of time; determining a user data usage scenario according to the pattern of network data usage; and switching a current wireless network mode to a selected wireless network mode according to the user data usage scenario.

12 Claims, 4 Drawing Sheets

(56) References Cited

U.S. PATENT DOCUMENTS

| | | | |
|---|---|---|---|
| 2013/0012161 A1* | 1/2013 | Rubin et al. | 455/406 |
| 2013/0023230 A9* | 1/2013 | Momtahan et al. | 455/405 |
| 2013/0196615 A1* | 8/2013 | Zalmanovitch | H04W 24/02 455/405 |
| 2013/0196617 A1* | 8/2013 | Zalmanovitch et al. | 455/405 |
| 2013/0196621 A1* | 8/2013 | Guday et al. | 455/406 |

FOREIGN PATENT DOCUMENTS

| | | |
|---|---|---|
| JP | 2000307660 A | 11/2000 |
| JP | 2002112347 A | 4/2002 |
| JP | 2004362020 A | 12/2004 |
| JP | 2006345174 A | 12/2006 |
| JP | 2008177777 A | 7/2008 |
| JP | 2008541626 A | 11/2008 |
| JP | 2010518665 A | 5/2010 |
| JP | 2011124945 A | 6/2011 |
| WO | 2006122233 A2 | 11/2006 |

OTHER PUBLICATIONS

Notice of allowance mailed on Oct. 21, 2014 for the Japanese application No. 2013-078310, filing date: Apr. 4, 2013, pp. 1-3.

* cited by examiner

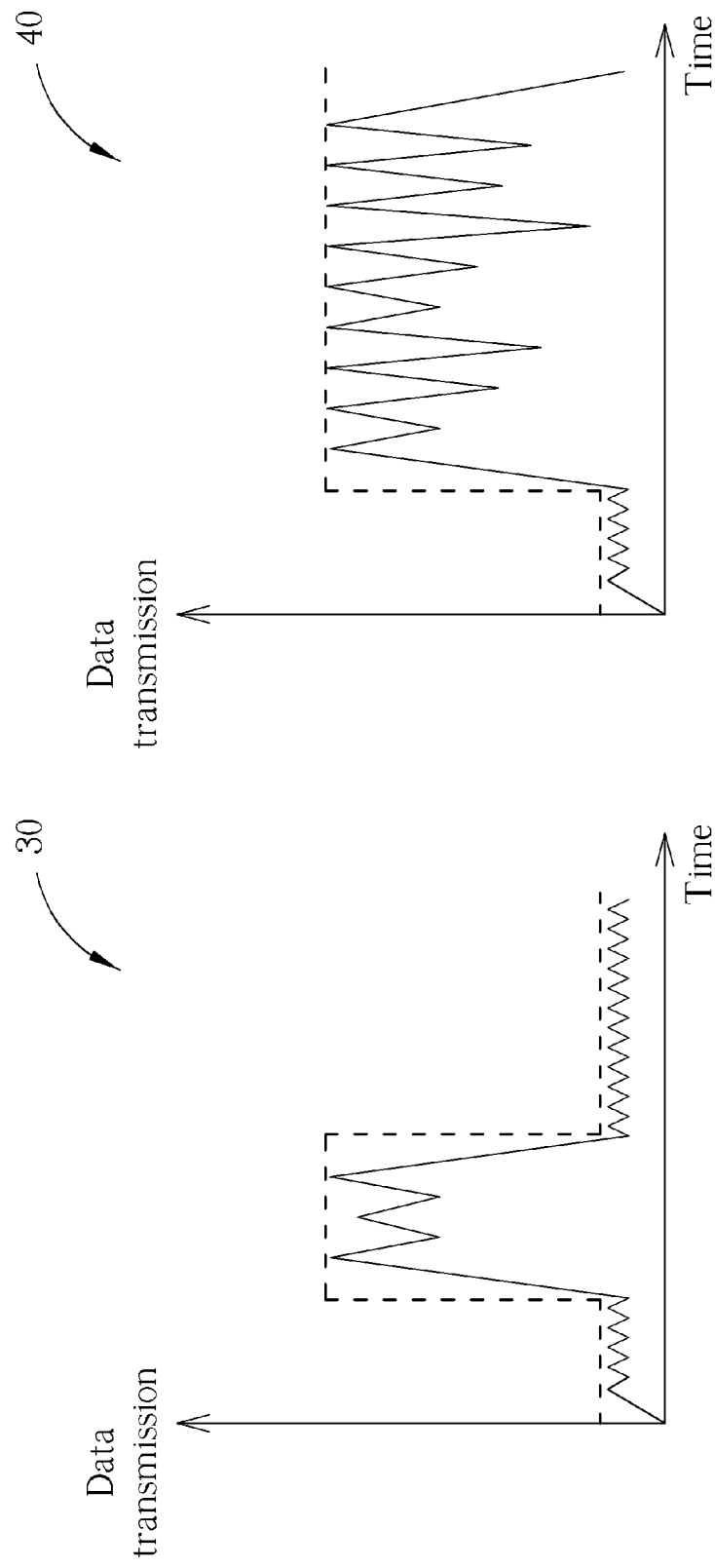

WIRELESS DATA NETWORK SWITCHING METHOD AND ELECTRONIC DEVICE THEREOF

CROSS REFERENCE TO RELATED APPLICATIONS

This application claims the benefit of U.S. Provisional Application No. 61/620,982, filed on Apr. 6, 2012 and entitled "Smart wireless data network switching method", the contents of which are incorporated herein by reference.

BACKGROUND OF THE INVENTION

1. Field of the Invention

The present invention relates to a wireless data network switching method and electronic device thereof, and more particularly, to a wireless data network switching method and electronic device thereof capable of determining a user data usage scenario according to a pattern of network data usage and switching a current wireless network mode to a best-fit wireless network mode accordingly, so as to meet data throughput requirement and save power.

2. Description of the Prior Art

Electronic devices, such as mobile devices, are usually equipped with a plurality of wireless network modules for operating in a plurality of wireless network modes, such as IEEE 802.11, Universal Mobile Telecommunications System (UMTS), Long Term Evolution (LTE), Worldwide Interoperability for Microwave Access (WiMAX), etc. Basically, the higher data transmission throughput usually consumes more power consumption. Therefore, it is impractical to always utilize a wireless network module with a highest transmission throughput, which results in unnecessary power consumption.

Under such a situation, how to select the best-fit wireless network mode among the plurality of wireless network modules operating in the plurality of wireless network modes to fulfill both data throughput and power saving criterion would be one of the most important features which modern electronic devices should be equipped with.

SUMMARY OF THE INVENTION

It is therefore an objective of the present invention to provide a wireless data network switching method and electronic device thereof capable of determining a user data usage scenario according to a pattern of network data usage and switching a current wireless network mode to a best-fit wireless network mode accordingly, so as to meet data throughput requirement and save power.

The present invention discloses a wireless data network switching method for an electronic device. The wireless data network switching method includes recording a pattern of network data usage of the electronic device during a period of time; determining a user data usage scenario according to the pattern of network data usage; and switching a current wireless network mode to a selected wireless network mode according to the user data usage scenario.

The present invention further discloses an electronic device. The electronic device includes a plurality of wireless network modules, for operating in a plurality of wireless network modes; and a controller, for receiving data via one of the plurality of wireless network modules operating in a current wireless network mode, recording a pattern of network data usage during a period of time, determining a user data usage scenario according to the pattern of network data usage, and switching the current wireless network mode of the current wireless network to a selected wireless network mode of a selected wireless network for receiving following data according to the user data usage scenario.

The present invention further discloses an electronic device. The electronic device includes a plurality of wireless network modules, for operating in a plurality of wireless network modes; a computer readable recording medium for storing a program code; and a processor coupled to the computer readable recording medium, for executing the program code perform steps of recording a pattern of network data usage of the electronic device during a period of time; determining a user data usage scenario according to the pattern of network data usage; and switching a current wireless network mode to a selected wireless network mode according to the user data usage scenario.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3-4 are schematic diagrams of network data usages of a low data usage scenario and a high data usage scenario during A period of time according to en embodiment of the present invention, respectively.

DETAILED DESCRIPTION

Figure 1:
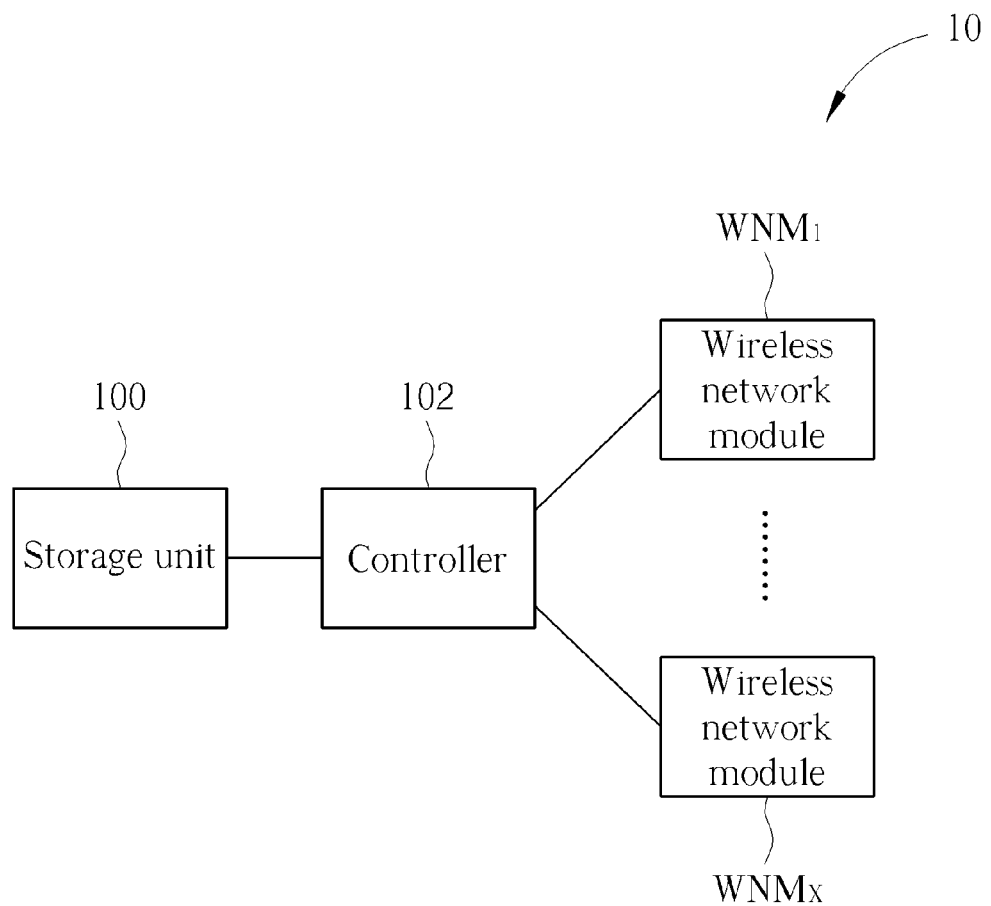
FIG. 1 is a schematic diagram of an electronic device according to an embodiment of the present invention.

Please refer to FIG. 1, which is a schematic diagram of an electronic device 10 according to an embodiment of the present invention. As shown in FIG. 1, the electronic device 10 includes wireless network modules $WNM_1$-$WNM_x$, a storage unit 100 and a controller 102. In short, the wireless network modules $WNM_1$-$WNM_x$ operate in distinct wireless network modes, such as, but not limited to, IEEE 802.11 Wireless Fidelity (Wi-Fi), Evolution-Data Optimized (EV-DO), General Packet Radio Service (GPRS), Universal Mobile Telecommunications System (UMTS), Long Term Evolution (LTE), Worldwide Interoperability for Microwave Access (WiMAX), Evolution-Data Optimized (EVDO), Time Division Synchronous Code Division Multiple Access (TD-SCDMA), Time Division Long Term Evolution (TD-LTE) and Long Term Evolution Advanced (LTE Advanced), etc., and the controller 102 receives data via a current wireless network module $WNM_a$ of the wireless network modules $WNM_1$-$WNM_x$, which operates in a current wireless network mode. Then, the controller 102 records a pattern of network data usage (i.e. received data) in the storage unit 100 such as a random-access memory (RAM), a NAND flash during a period of time, and determines a user data usage scenario according to the pattern of network data usage, to switch the current wireless network mode of current wireless network module $WNM_a$ to a selected wireless network mode of a selected wireless network module $WNM_b$ for receiving following data according to the user data usage scenario. As a result, the present invention determines the user data usage scenario according to the pattern of network data usage during the detected period of time, and then timely switches the current wireless network mode to a best-fit wireless network mode accordingly, so as to meet data throughput requirement and save power.

Figure 2:
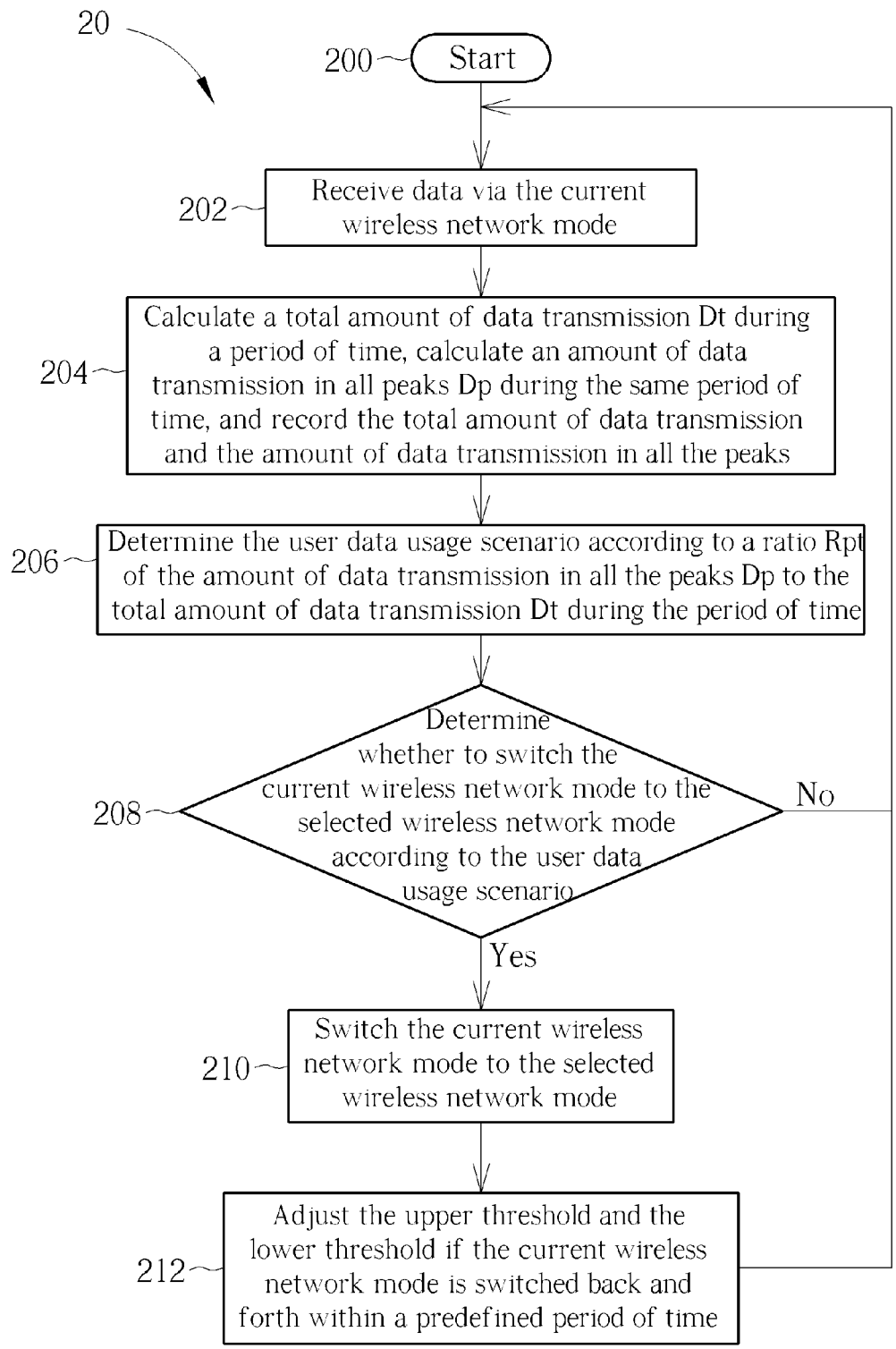
FIG. 2 is a wireless data network switching process for the electronic device shown in FIG. 1 according to an embodiment of the present invention.
Figure 5:
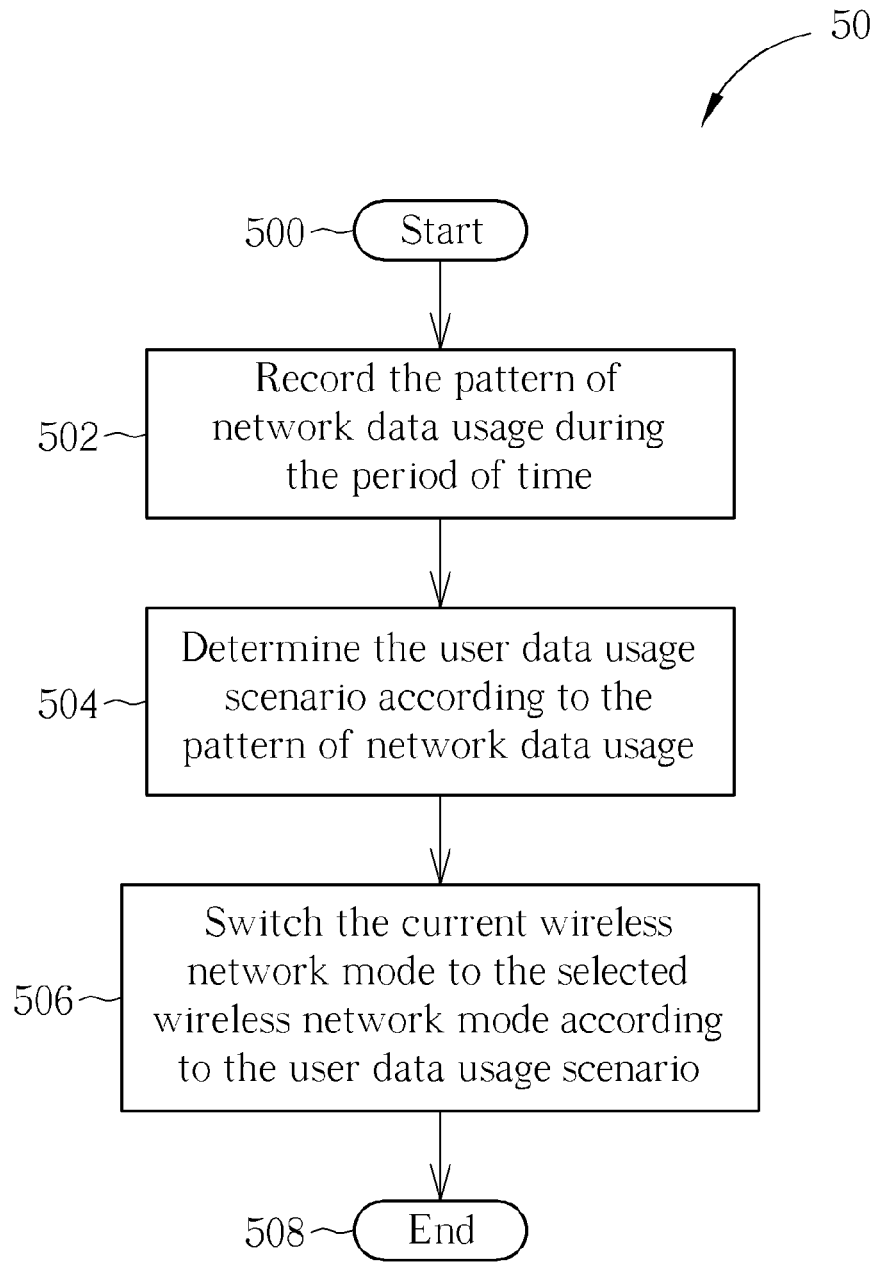
FIG. 5 is a wireless data network switching process according to another embodiment of the present invention.

In detail, please refer to FIG. 2, which is a wireless data network switching process 20 for the electronic device 10 according to an embodiment of the present invention. As shown in FIG. 2, the wireless data network switching process 20 includes following steps:

Step 200: Start.

Step 202: Receive data via the current wireless network mode.

Step 204: Calculate a total amount of data transmission Dt during a period of time, calculate an amount of data transmission in all peaks Dp during the same period of time, and record the total amount of data transmission and the amount of data transmission in all the peaks.

Step 206: Determine the user data usage scenario according to a ratio Rpt of the amount of data transmission in all the peaks Dp to the total amount of data transmission Dt during the period of time.

Step 208: Determine whether to switch the current wireless network mode to the selected wireless network mode according to the user data usage scenario. If yes, go to step 210; if no, go to step 202.

Step 210: Switch the current wireless network mode to the selected wireless network mode.

Step 212: Adjust the upper threshold and the lower threshold if the current wireless network mode is switched back and forth within a predefined period of time. Go to step 202.

According to the wireless data network switching process 20, when the controller 102 receives data via the wireless network module $WNM_a$ operating in the current wireless network mode, the controller 102 calculates a total amount of data transmission Dt during a period of time, calculates an amount of data transmission in all the peaks Dp during the same period of time, and records the total amount of data transmission and the amount of data transmission in the all peaks in the storage unit 100, wherein the peaks have a transmission rates higher than a threshold and relatively higher than other transmission rates during the period. Then, the controller 102 determines the user data usage scenario according to a ratio Rpt of the amount of data transmission in all the peaks Dp to the total amount of data transmission Dt during the period of time, so as to determine whether to switch the current wireless network mode to the selected wireless network mode according to the user data usage scenario.

In detail, since network data transmission is burst transmission, more peaks during transmission indicate higher data throughput is required, i.e. the ratio Rpt is corresponding to required data throughput of the user data usage scenario. Besides, the upper threshold Tu is properly set and predefined to be corresponding to data throughput the current wireless network mode of current wireless network module $WNM_a$ can manage to support, while the lower threshold T1 is properly set and predefined to be corresponding to data throughput below which power consumption of the current wireless network mode of current wireless network module $WNM_a$ is considered unnecessary.

Therefore, if the ratio Rpt is lower than the upper threshold Tu and higher than the lower threshold T1, the controller 102 determines the user data usage scenario is a current-speed data usage scenario, wherein the current wireless network mode can provide enough data throughput and power consumption of the current wireless network mode is adequate, and thus the controller 102 does not switch the current wireless network mode, and still receives data via the current wireless network mode.

On the contrary, if the ratio Rpt is higher than the upper threshold Tu, the controller 102 determines the user data usage scenario is a higher-speed data usage scenario, and then switches the current wireless network mode of the current wireless network $WNM_a$ to the selected wireless network mode of the selected wireless network module $WNM_b$ with a speed (i.e. data throughput) higher than a speed of the current wireless network. In other words, when the current wireless network mode of the current wireless network $WNM_a$ can not provide enough data throughput for the current user data usage scenario, the controller 102 switches the current wireless network mode to the selected wireless network mode capable of providing higher data throughput to receive following data.

On the other hand, if the ratio Rpt is lower than the lower threshold T1, the controller 102 determines the user data usage scenario is a lower-speed data usage scenario, and then switches the current wireless network mode of the current wireless network $WNM_a$ to the selected wireless network mode of the selected wireless network module $WNM_b$ with a speed lower than a speed of the current wireless network. In other words, when power consumption of the current wireless network mode of current wireless network module $WNM_a$ is considered unnecessary for the current user data usage scenario, the controller 102 switches the current wireless network mode to the selected wireless network mode with less power consumption to receive following data. As a result, the controller 102 switches the current wireless network mode to a best-fit wireless network mode, so as to meet data throughput requirement and save power.

For example, please refer to FIG. 3-4, which are schematic diagrams of network data usages of a low data usage scenario 30 and a high data usage scenario 40 during the period of time according to an embodiment of the present invention, respectively. As shown in FIG. 3, the low data usage scenario 30 includes only three peaks (i.e. the three peaks have transmission rates higher than a threshold and relatively higher than other transmission rates during the period), and data transmission during the period of time other than the three peaks is low (e.g. the low data usage scenario 30 can be website browsing which has high data transmission only when a new website is opened). Therefore, the ratio Rpt is low and a wireless network mode with relatively low data throughput (e.g. Wi-Fi, UMTS) can support the low data usage scenario 30 without unnecessary power consumption.

On the other hand, as shown in FIG. 4, the high data usage scenario 40 includes peaks almost all over the period of time (e.g. the high data usage scenario 40 can be video streaming which has high data transmission during video data is received). Therefore, the ratio Rpt is high and a wireless network mode with relatively high data throughput (e.g. LTE, WiMAX) can support the high data usage scenario 40.

Under such a situation, when a user changes from the low data usage scenario 30 to the high data usage scenario 40, the controller 102 determines the high data usage scenario 40 having the ratio Rpt higher than the upper threshold Tu set for the low data usage scenario 30, and switches the current wireless network mode to the selected wireless network mode capable of providing higher data throughput to support the high data usage scenario 40. On the other hand, when a user changes from the high data usage scenario 40 to the low data usage scenario 30, the controller 102 determines the low data usage scenario 30 having the ratio Rpt lower than the lower threshold T1 set for the high data usage scenario 40, and switches the current wireless network mode to the selected wireless network mode with less power consumption to receive following data and thus save power.

Moreover, according to step 212, the controller 102 adjusts the upper threshold Tu and the lower threshold T1 if the current wireless network mode is switched back and forth within a predefined period of time. That is, the controller 102 increases the upper threshold Tu and decreases the lower threshold if the controller 102 switches the current wireless network mode back and forth among the wireless network modes within a predefined period of time, to avoid switching the current wireless network mode too frequently if the upper threshold Tu and the lower threshold T1 are set improperly. After adjusting, the upper threshold Tu and the lower threshold T1 values are restored back to original predefined values if the corresponding wireless network mode is not using for a predefined period of time.

Noticeably, a spirit of the present invention is to determine the user data usage scenario according to the pattern of network data usage during the detected period of time, and then timely switch the current wireless network mode to a best-fit wireless network mode accordingly, so as to meet data throughput requirement and save power. Those skilled in the art should make modifications or alterations accordingly. For example, in the above embodiment, the controller 102 determines the user data usage scenario according to the ratio Rpt, but the controller 102 can also determine the user data usage scenario only according to the total amount of data transmission Dt during the period of time. That is, when the total amount of data transmission Dt during the period of time is lower than a transmission threshold, even if the ratio Rpt is high (e.g. radio broadcast), the controller 102 still determines the user data usage scenario is a low-speed data usage scenario which can be supported by a wireless network mode with relatively low data throughput.

The above operations of the electronic device 10 can be summarized into a wireless data network switching process 50. The wireless data network switching process 50 includes following steps:

Step 500: Start.

Step 502: Record the pattern of network data usage during the period of time.

Step 504: Determine the user data usage scenario according to the pattern of network data usage.

Step 506: Switch the current wireless network mode to the selected wireless network mode according to the user data usage scenario.

Step 508: End.

Details of the wireless data network switching process 50 can be derived by referring to the above description, and are not narrated hereinafter.

Please note that the controller 102 may include a processor and a computer readable recording medium. The computer readable recording medium is any data storage device that includes a program code, thereafter read and performed by the processor. Examples of the computer readable recording medium include a subscriber identity module (SIM), a universal subscriber identity module (USIM), read-only memory (ROM), random-access memory (RAM), CD-ROMs, magnetic tapes, hard disks, optical data storage devices, and carrier waves (such as data transmission through the Internet). The processor can execute the program code to perform the process 20 or 50.

In summary, the present invention determines the user data usage scenario according to the pattern of network data usage during the detected period of time, and timely switches the current wireless network mode to a best-fit wireless network mode accordingly, so as to meet data throughput requirement and save power Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless data network switching method on a mobile device equipped with a plurality of wireless network modules for operating in a plurality of wireless network modes wherein lower data transmission throughput of the plurality of wireless network modes consume less power consumption, comprising:

recording, by the mobile device, a pattern of network data usage of the electronic device during a period of time;

determining, by the mobile device, a user data usage scenario according to the pattern of network data usage;

switching, by the mobile device, a current wireless network mode of the plurality of wireless network modes to another wireless network mode of the plurality of wireless network modes with lowest power consumption that meets data throughput requirement for receiving following data by the another wireless network mode of the plurality of wireless network modes according to the user data usage scenario and power consumption of the plurality of wireless network modes;

determining and adjusting, by the mobile device, an upper threshold of the pattern of network data usage and a lower threshold of the pattern of network data usage if the current wireless network mode is switched to another wireless network mode of the plurality of wireless network modes within a predefined period of time;

increasing, by the mobile device, the upper threshold if the current wireless network mode is switched to the another wireless network mode with a first speed higher than a second speed of the current wireless network mode; and decreasing, by the mobile device, the lower threshold if the current wireless network mode is switched to the another wireless network mode with a third speed lower than the second speed of the current wireless network mode;

wherein the pattern of network data usage is a ratio of an amount of data transmission in peaks to a total amount of data transmission during the period of time.

2. The wireless data network switching method of claim 1, wherein the step of recording, by the mobile device, the pattern of network data usage of the electronic device during the period of time comprises:

calculating, by the mobile device, the total amount of data transmission during the period of time;

calculating, by the mobile device, the amount of data transmission in peaks during the period of time; and recording, by the mobile device, the total amount of data transmission and the amount of data transmission in the peaks.

3. The wireless data network switching method of claim 2, wherein the step of determining, by the mobile device, the user data usage scenario according to the pattern of network data usage comprises:

determining, by the mobile device, the user data usage scenario according to the ratio of the amount of data transmission in the peaks to the total amount of data transmission during the period of time.

4. The wireless data network switching method of claim 1, wherein the wireless network mode comprises at least two of following:
Wireless Fidelity (Wi-Fi), Evolution-Data Optimized (EV-DO), General Packet Radio Service (GPRS), Universal Mobile Telecommunications System (UMTS), Long Term Evolution (LTE), Worldwide Interoperability for Microwave Access (WiMAX), EVDO, TD-SCDMA, TD-LTE and LTE Advanced.

5. A mobile device, comprising:
a plurality of wireless network modules, for operating in a plurality of wireless network modes wherein lower data transmission throughput of the plurality of wireless network modes consume less power consumption; and
a controller, for receiving data via one of the plurality of wireless network modules operating in a current wireless network mode, recording a pattern of network data usage during a period of time, determining a user data usage scenario according to the pattern of network data usage, switching the current wireless network mode of the plurality of wireless network modes of the current wireless network to another wireless network mode of the plurality of wireless network modes with lowest power consumption that meets data throughput requirement of another wireless network for receiving following data by the another wireless network mode of the plurality of wireless network modes according to the user data usage scenario and power consumption of the plurality of wireless network modes, determining and adjusting an upper threshold of the pattern of network data usage and a lower threshold of the pattern of network data usage if the current wireless network mode is switched to another wireless network mode of the plurality of wireless network modes within a predefined period of time, increasing the upper threshold if the current wireless network mode is switched to the another wireless network mode with a first speed higher than a second speed of the current wireless network mode, and decreasing the lower threshold if the current wireless network mode is switched to the another wireless network mode with a third speed lower than the second speed of the current wireless network mode;
wherein the pattern of network data usage is a ratio of an amount of data transmission in peaks to a total amount of data transmission during the period of time.

6. The mobile device of claim 5, wherein the controller calculates the total amount of data transmission during the period of time, calculates the amount of data transmission in peaks during the period of time, and records the total amount of data transmission and the amount of data transmission in the peaks.

7. The mobile device of claim 6, wherein the controller determines the user data usage scenario according to the ratio of the amount of data transmission in the peaks to the total amount of data transmission during the period of time.

8. The mobile device of claim 5, wherein the wireless network mode comprises at least two of following:
Wireless Fidelity (Wi-Fi), Evolution-Data Optimized (EV-DO), General Packet Radio Service (GPRS), Universal Mobile Telecommunications System (UMTS), Long Term Evolution (LTE), Worldwide Interoperability for Microwave Access (WiMAX), EVDO, TD-SCDMA, TD-LTE and LTE Advanced.

9. A mobile device, the mobile device comprising:
a plurality of wireless network modules, for operating in a plurality of wireless network modes wherein lower data transmission throughput of the plurality of wireless network modes consume less power consumption;
a computer readable recording medium for storing a program code; and
a processor coupled to the computer readable recording medium, for executing the program code perform steps of:
recording a pattern of network data usage of the electronic device during a period of time;
determining a user data usage scenario according to the pattern of network data usage;
switching a current wireless network mode of the plurality of wireless network modes to another wireless network mode of the plurality of wireless network modes with lowest power consumption that meets data throughput requirement for receiving following data by the another wireless network mode of the plurality of wireless network modes according to the user data usage scenario and power consumption of the plurality of wireless network modes; and
determining and adjusting an upper threshold of the pattern of network data usage and a lower threshold of the pattern of network data usage if the current wireless network mode is switched to another wireless network mode of the plurality of wireless network modes within a predefined period of time;
increasing the upper threshold if the current wireless network mode is switched to the another wireless network mode with a first speed higher than a second speed of the current wireless network mode; and
decreasing the lower threshold if the current wireless network mode is switched to the another wireless network mode with a third speed lower than the second speed of the current wireless network mode;
wherein the pattern of network data usage is a ratio of an amount of data transmission in peaks to a total amount of data transmission during the period of time.

10. The mobile device of claim 9, wherein the processor executing the program code to perform the step of recording the pattern of network data usage of the electronic device during the period of time comprises:
calculating the total amount of data transmission during the period of time;
calculating the amount of data transmission in peaks during the period of time; and
recording the total amount of data transmission and the amount of data transmission in the peaks.

11. The mobile device of claim 10, wherein the processor executing the program code to perform the step of determining the user data usage scenario according to the pattern of network data usage comprises:
determining the user data usage scenario according to the ratio of the amount of data transmission in the peaks to the total amount of data transmission during the period of time.

12. The mobile device of claim 9, wherein the wireless network mode comprises at least two of following:
Wireless Fidelity (Wi-Fi), Evolution-Data Optimized (EV-DO), General Packet Radio Service (GPRS), Universal Mobile Telecommunications System (UMTS), Long Term Evolution (LTE), Worldwide Interoperability for Microwave Access (WiMAX), EVDO, TD-SCDMA, TD-LTE and LTE Advanced.

* * * * *